June 30, 1931.    T. H. SLOAN    1,812,565
METHOD OF FREE PRESSING GLASSWARE HAVING IRREGULAR EDGES Filed April 9, 1930

WITNESS
A. B. Wallace.

INVENTOR
Theodore H. Sloan,
by Brown & Critchlow,
his attorneys.

Patented June 30, 1931

1,812,565

UNITED STATES PATENT OFFICE

THEODORE H. SLOAN, OF CHARLEROI, PENNSYLVANIA, ASSIGNOR TO MACBETH-EVANS GLASS COMPANY, A CORPORATION OF PENNSYLVANIA

METHOD OF FREE-PRESSING GLASSWARE HAVING IRREGULAR EDGES

Application filed April 9, 1930. Serial No. 442,774.

This invention relates to what is herein designated as the free-pressing of glass articles having irregular edges.

In my copending patent application Serial No. 442,773, filed of even date herewith, I have disclosed an improved method of pressing finished glassware, according to which a body of molten glass is placed in a mold having an article-forming cavity greater than the body of molten glass, the glass being then pressed into desired finished form between the plunger and mold members of the press to cause the glass to flow towards but not to the periphery of the cavity. In said application the applicability of said invention to various forms of tableware, such as plates, tumblers, cups, berry dishes, etc. is described and illustrated. In the forming of each of these, and of other articles contemplated by the invention, the articles are free from seams and over-pressing cracks which characterize the pressing of articles according to the prevailing practice by the use of molds having rings which customarily limit the flow of glass being pressed. Because in the practice of that method the glass is unrestricted as to the extent of its lateral or other flow under the action of press mold members, said method is designated throughout this specification, and in the appended claims, as "free-pressing".

The present invention is based upon my discovery that when, in the practice of said free-pressing method, the glass-contacting face or faces of the mold and mold plunger are provided with projections or recesses in such a way as to form a mold cavity of different thickness along different paths of flow of the molten glass adjacent to the edges of articles being pressed, the glass will flow farther along the paths of greater mold-cavity thicknesses, and form a pleasing irregular edge on the article being pressed.

Figure 1:
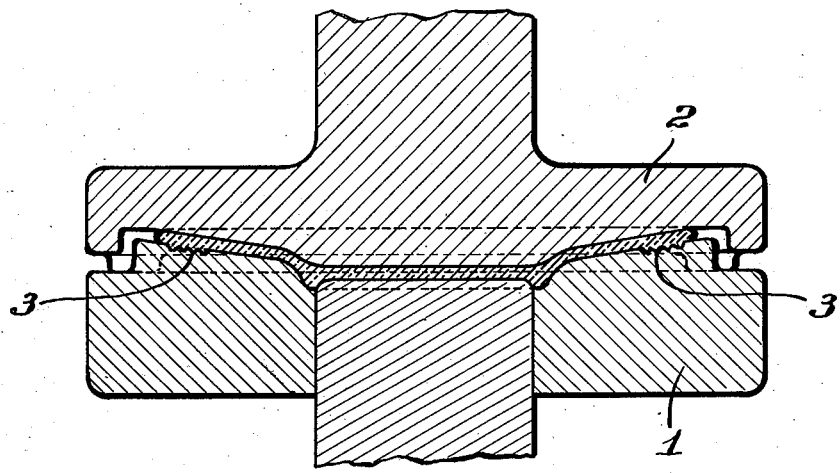

The invention will be further explained with reference to the accompanying drawings, of which Fig. 1 is a somewhat diagrammatic vertical central sectional view of a mold and plunger for free-pressing a plate, the parts being shown in their relative positions at the completion of a pressing operation, and with a pressed plate between them; and Fig. 2 a face view of a plate free-pressed in the mold of Fig. 1.

Figure 2:
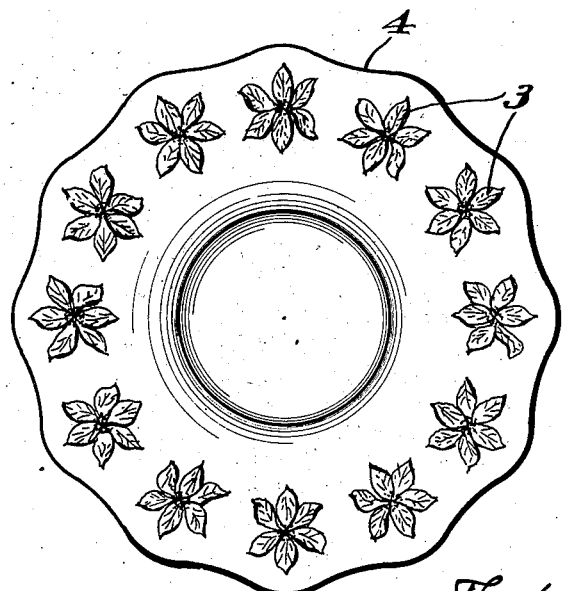

As shown in Fig. 2, plate 1 is provided adjacent to its edge with a plurality of flower-like decorations 2 formed by relief projections on its rear face. For forming these projections, the glass-contacting face of mold 1 is provided as by etching, machining, or otherwise, with recesses 3 of the desired configurations of the decorations, such recesses increasing the thickness of the mold cavity between the faces of mold 1 and plunger 2, as shown in Fig. 1. When a gather of molten glass is free-pressed between mold 1 and plunger 2, the gather is placed on the center of the mold, preferably by a gob or other suitable mechanical feeder, and the plunger lowered to cause the glass to freely flow laterally towards the edge of the mold cavity. In thus flowing laterally, the glass travels farther at points beyond the thickened portions of the mold cavity formed by the recesses 3, and in this particular instance, results in the formation of flutes 4 beyond the decorated areas, as shown in Fig. 2.

By varying the thicknesses of the decorative projections formed on a pressed glass article, or in other words, by increasing or diminishing the variations in the thickness of the mold cavity, the glass may be caused to flow different amounts to form greater or less pronounced irregular edges. Furthermore, by so forming the mold that glassware having irregular or unsymmetrical decorations is molded by it, the edges of the glassware may be given pleasing irregular edges other than the uniformly fluted edge shown on plate 1.

While the invention has been described and illustrated only in its applicability to the free-pressing of finished plates, I have found that it is also applicable to the free-pressing of other articles, such as berry dishes and bowls shown in my above mentioned patent application. Any of such articles may, according to this invention, be so pressed as to have an irregular edge, by which is meant, throughout this speification and in the appended claims, an edge which is not a continuous circle or other curve, but which is broken up into flutes or other configurations which may be either regular or irregular with relation to each other.

According to the provisions of the patent statutes, I have explained the principle and mode of operation of my invention, and have illustrated apparatus whereby it may be practiced. However, I desire to have it understood that, within the scope of the appended claims, the invention may be practiced otherwise than as specifically explained, and that in the practice of the invention various forms and types of molds may be used, including those having refined features of construction and design.

I claim as my invention:

1. The method of forming a finished glass article having an irregular edge, comprising forming between plunger and mold members of a glass press a mold cavity of different thicknesses adjacent to the edge of the mold cavity and along different lines of flow of glass between said members, and free-pressing a molten body of glass between said members thereby causing the glass to flow farther along the thicker paths of flow and form an irregular edge on the article.

2. The method of manufacturing finished pressed glassware having an irregular edge, consisting of forming between plunger and mold members of a glass press a mold cavity of different thicknesses along different lines of flow of glass between said members, placing in the center of the press mold a body of molten glass of less volume than the article-forming cavity between the mold and plunger, and forming an article from said glass solely by pressing the glass between said members and thereby causing it to flow towards but not to the outer boundary of said cavity and to chill with a permanent convexly rounded and completely finished edge, the glass flowing farther along the thicker paths of flow in said cavity to form said edge irregular in its longitudinal extent.

In testimony whereof, I sign my name.

THEODORE H. SLOAN.